(12) United States Patent
Praharaj et al.

(10) Patent No.: US 12,053,982 B2
(45) Date of Patent: Aug. 6, 2024

(54) SYSTEM AND METHOD FOR SELECTING INKJETS TO IMPROVE INK IMAGE QUALITY IN AN INKJET PRINTER

(71) Applicant: Xerox Corporation, Norwalk, CT (US)

(72) Inventors: Seemit Praharaj, Webster, NY (US); Jason M. LeFevre, Penfield, NY (US); Douglas K. Herrmann, Webster, NY (US); Chu-Heng Liu, Penfield, NY (US); Jorge A. Alvarez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 171 days.

(21) Appl. No.: 17/932,165

(22) Filed: Sep. 14, 2022

(65) Prior Publication Data

US 2024/0083165 A1 Mar. 14, 2024

(51) Int. Cl.
*B41J 2/045* (2006.01)
(52) U.S. Cl.
CPC .................. *B41J 2/04558* (2013.01)
(58) Field of Classification Search
CPC .................. B41J 2/04558; G06K 15/107
See application file for complete search history.

(56) References Cited

U.S. PATENT DOCUMENTS

| | | | |
|---|---|---|---|
| 6,406,111 B1 | 6/2002 | Klassen et al. |
| 7,639,891 B2 | 12/2009 | Loce et al. |
| 8,619,332 B2 | 12/2013 | Karito et al. |
| 2012/0019589 A1 | 1/2012 | Gila et al. |
| 2012/0236052 A1 | 9/2012 | Tobita et al. |
| 2014/0285546 A1 | 9/2014 | Furuta |

FOREIGN PATENT DOCUMENTS

JP 3748782 B2 * 2/2006 ............ B41J 11/007

\* cited by examiner

*Primary Examiner* — Justin Seo
(74) *Attorney, Agent, or Firm* — Maginot Moore & Beck LLP

(57) ABSTRACT

A method of operating a printer identifies image areas in ink image content data that are likely to affected by airflow disturbances to produce ink blur within an ink image. Inkjets farthest from these areas are selected to eject ink drops into these areas to form portions of an ink image. The image areas identified as being likely to produce ink blur are the leading edge, trailing edge, and side edge of the ink image content data. The ink drops ejected by these selected inkjets and their satellites are less likely to be affected adversely by the airflow disturbances.

20 Claims, 12 Drawing Sheets

SYSTEM AND METHOD FOR SELECTING INKJETS TO IMPROVE INK IMAGE QUALITY IN AN INKJET PRINTER

TECHNICAL FIELD

This disclosure relates generally to devices that produce ink images on media, and more particularly, to the selection of inkjets to eject ink drops in such devices during printing.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content corresponding to images. The actuators in the printheads respond to the firing signals by expanding into an ink chamber to eject ink drops onto an image receiving surface and form an ink image that corresponds to the digital image content used to generate the firing signals. The image receiving surface is usually a continuous web of media material or a series of media sheets.

Inkjet printers used for producing color images typically include multiple printhead assemblies. Each printhead assembly includes one or more printheads that typically eject a single color of ink. In a typical inkjet color printer, four printhead assemblies are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that print each color of ink. The printhead assemblies that print the same color of ink are offset from each other by one-half of the distance between adjacent inkjets in the cross-process direction to double the number of pixels per inch density of a line of the color of ink ejected by the printheads in the two assemblies. As used in this document, the term "process direction" means the direction of movement of the image receiving surface as it passes the printheads in the printer and the term "cross-process direction" means a direction that is perpendicular to the process direction in the plane of the image receiving surface.

Image quality in color inkjet printers depends upon on many factors such as ink chemistry, printhead technology, thermals in the vicinity of the ink drops, print process setpoints, airflows, and ink-to-media spreading and drying interactions. One issue that degrades image quality is the separation of the ink drops during the flight time from the inkjet nozzles to the ink receiving surface. When the ink drop is first ejected from a nozzle it is elongated and during the flight of the ink drop, the lead end and the tail end of the drop merge to form a coherent drop. Sometimes, however, the elongated portions of the drop separate from the leading end of the drop and produce satellite drops. These satellite drops tend to land outside of the landing area for the major portion of the ink drop that cohered before landing. The satellite drops are also more easily affected by airflow disturbances that are produced by the media vacuum transport at the inter-document zone (IDZ) between adjacent media sheets. These airflow disturbances adversely impact drop placement and degrade print quality in direct-to-paper ink-jet systems at the leading edges (LE), trailing edges (TE), and inboard edges (IB) of the media sheets where the vacuum system is exposed. Particularly, the exposed vacuum in the IDZ as well as the IB edge draws air from under the printheads and leads to a significant displacement in the landing location of the major portion of an ejected drop and any satellite drops produced, though the satellite drops that measure <5% of the main drop volume are much more susceptible to the disturbance airflow generated by the exposed vacuum transport. This satellite displacement can blur characters and other symbols printed on media and adversely impact the quality of printed ink images. As used in this document, the terms "satellites" and "ink satellites" mean portions of ink drops ejected from inkjets in a printhead that do not cohere to the drop from which they separated before the drop lands. As used in this document, "ink blur" means the presence of ink satellites in areas other than where the ink drop from which the satellites were produced landed. Reducing the effect of airflow disturbances on satellites during ink image printing would be beneficial.

SUMMARY

A color inkjet printer is configured to select inkjets for ejecting ink drops at the trailing edges, leading edges, and inboard edges of media sheets that are less likely to be affected by airflow disturbances at those portions of the media sheets. The color inkjet printer includes at least one printhead, a media transport for moving a media sheet relative to the at least one printhead in a process direction so the media sheet has a leading edge and trailing edge, and a controller operatively connected to the at least one printhead. The controller is configured to analyze ink image content data to identify ink image features in the ink image content data that are to be printed at the leading edge and the trailing edge of the media sheet in the process direction, select the inkjets to print the ink image content data at the leading edge and the trailing edge of the media sheet in the process direction, and operate the selected inkjets to print portions of an ink image at the leading edge and the trailing edge of an ink image that corresponds to the ink image content data.

A method of operating a color inkjet printer selects inkjets for ejecting ink drops at the trailing edges, leading edges, and inboard edges of media sheets that are less likely to be affected by airflow disturbances at those portions of the media sheets. The method includes analyzing ink image content data to identify ink image features in the ink image content data that are to be printed by at an leading edge and a trailing edge of a media sheet in the process direction, selecting the inkjets to print the ink image content data in the leading edge and the trailing edge of the media sheet in the process direction, and operating the selected inkjets to print portions of an ink image in the leading edge and the trailing edge of an ink image that corresponds to the ink image content data.

BRIEF DESCRIPTION OF THE DRAWINGS

The foregoing aspects and other features of a color inkjet printer and color inkjet printer operational method that selects inkjets for ejecting ink drops at the trailing edges, leading edges, and side edges that are less likely to be affected by airflow disturbances at those portions of the media sheets are explained in the following description, taken in connection with the accompanying drawings.

DETAILED DESCRIPTION

Figure 1:
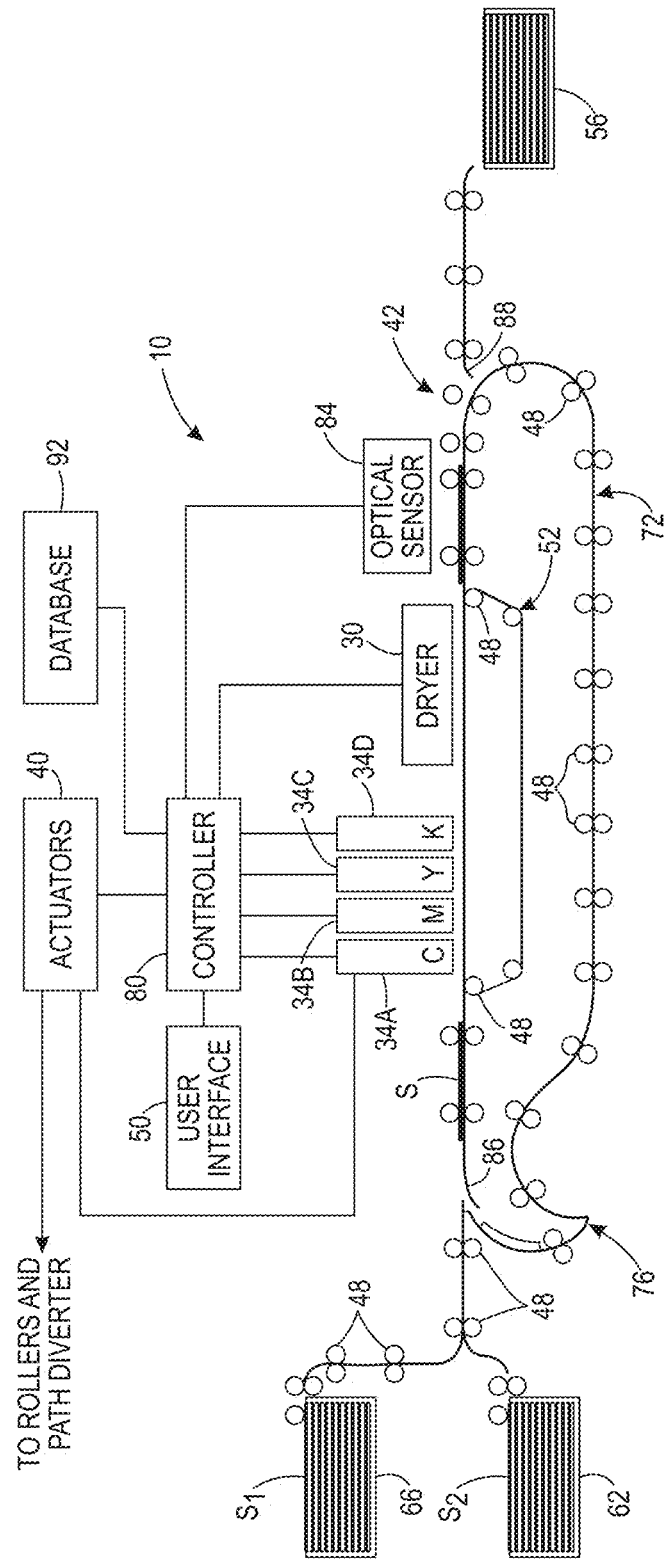
FIG. 1 is a schematic drawing of a color inkjet printer that is configured to select inkjets for ejecting ink drops at the trailing edges, leading edges, and side edges that are less likely to be affected by airflow disturbances at those portions of the media sheets.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto media to form ink images.

The printer and method described below select inkjets for ejecting ink drops at the trailing edges, leading edges, and side edges that are less likely to be affected by airflow disturbances at those portions of the media sheets. Specifically, the selected inkjets for ejecting ink drops at the leading, trailing and side edge areas of media sheets are those at a sufficient distance from these areas that the vacuum transport does not produce airflow disturbances capable of affecting the landing of the ejected ink drops and their satellites.

FIG. 1 depicts a high-speed color inkjet printer 10 that is configured to select inkjets for ejecting ink drops at the trailing edges, leading edges, and side edges that are less likely to be affected by airflow disturbances at those portions of the media sheets. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprises a portion of the media transport 42 that passes through the print zone PZ (shown in FIG. 2) of the printer.

In one embodiment, each printhead module of the printer 10 has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

The media transport 42 includes a belt for moving print media, such as paper sheets, envelopes, or any other article suitable for receiving printed images, through the print zone so the printheads can eject ink drops onto the moving media to form printed images on the media. The belt has holes in it and the belt moves over a vacuum plenum within the conveyor 52 so a suction force can be generated through the surface of the belt. Each print medium engages a portion of the holes on the surface of the belt and the suction force holds the print medium to the surface of the belt to prevent the print media from slipping or otherwise moving relative to the surface of the belt as the belt moves through the printer. Holding each print medium in place relative to the surface of the moving belt enables the printer to control the timing of the operation of printheads to ensure that the printheads form printed images in proper locations on each print medium and ensures that the print media do not cause jams or other mechanical issues with the printer. In large-scale printer configurations, the belt often carries multiple print media simultaneously.

Figure 2:
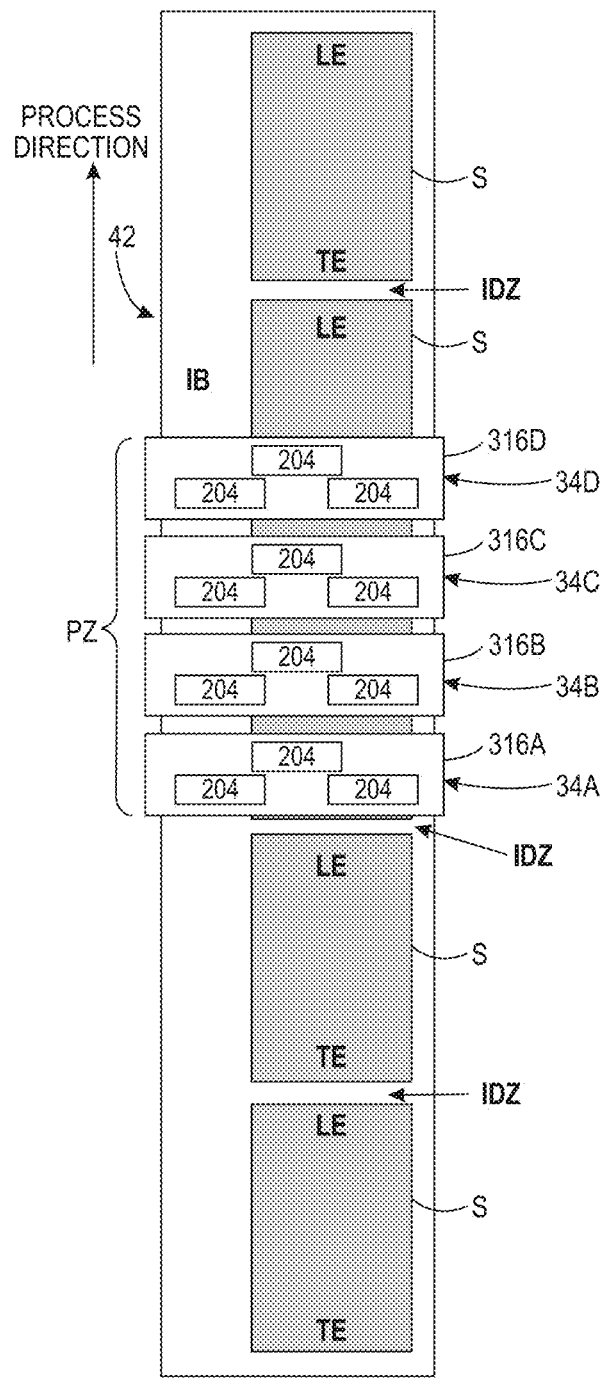
FIG. 2 depicts the print zone in the printer of FIG. 1.

The print zone PZ in the printer 10 of FIG. 1 is shown in FIG. 2. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2 has three printheads 204 mounted to one of the printhead carrier plates 316A, 316B, 316C, and 316D, respectively. The legends TE, LE, and IB represent, respectively, the trailing edge, the leading edge, and the inboard edges of the media sheets passing through the print zone. The portion of the belt exposed between the TE and the LE of consecutive sheets is called an inter-document zone (IDZ) and the belt is also exposed in the IB area. Because no media sheet is covering the belt holes in the IDZ and IB areas, the vacuum produces airflow disturbances in these areas. These disturbances can affect the landing of ink drops ejected near these areas. The IB edge exposes the vacuum plenum through the transport belt because the outboard edge of the media is always aligned with the outermost position of the print zone in the cross-process direction. In other printers that align the edge of the media sheets with the innermost edge of the print zone in the cross-process direction, the printer compensates for airflow disturbances in the outboard area.

With continued reference to FIG. 1, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the media transport 42 after a substrate has been printed and move it by the rotation of rollers in an opposite direction to the direction of movement past the printheads. At position 76 in the duplex path 72, the substrate can be turned over so it can merge into the job stream being carried by the media transport 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 1, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80. The controller 80 is configured to detect streakiness in the printed images on the media sheets of a print job. Additionally, sheets that are printed with test pattern images are inserted at intervals during the print job. These test pattern images are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the right mass or landing at an errant position is called an inoperative inkjet in this document. The controller can store data identifying the inoperative inkjets in database 92 operatively connected to the controller. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. The optical sensor can be a digital camera, an array of LEDs and photodetectors, or other devices configured to generate image data of a passing surface. As already noted, the media transport also includes a duplex path that can turn a sheet over and return it to the media transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image content data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, ink image content data for an ink image to be produced is sent to the controller 80 from either a scanning system or an online or work station connection. The ink image content data is processed to generate the inkjet ejector firing signals delivered to the printheads in the modules 34A-34D. Along with the ink image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "ink image content data" means digital data that identifies a color and a volume of each ejected ink drop that forms pixels in an ink image to be printed on a media sheet.

Figure 9:
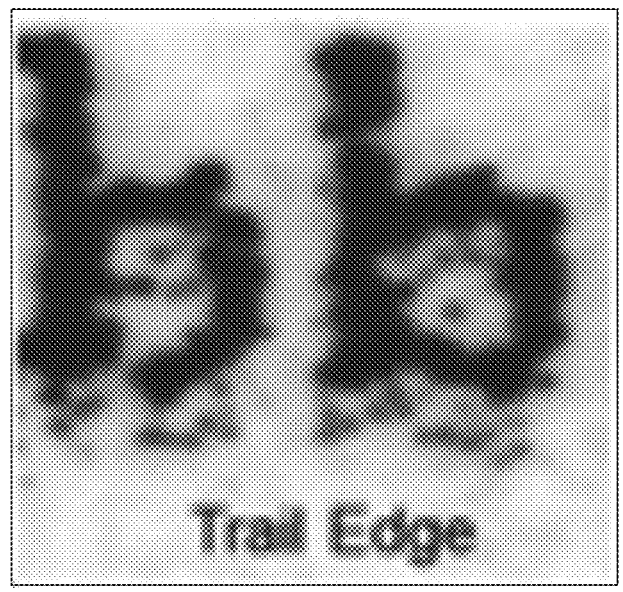
FIG. 9 illustrates the impact of ink drop satellites on the clarity of a pair of printed characters.
Figure 10:
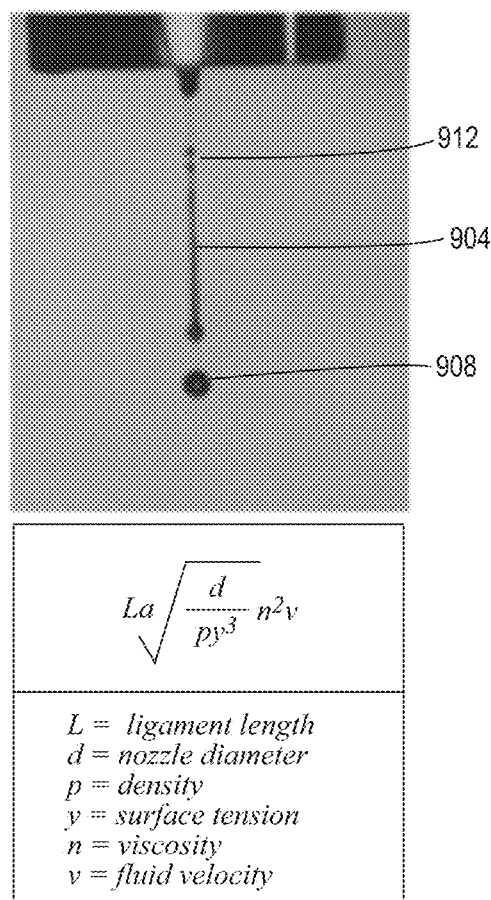
FIG. 10 illustrates a ligament of an ejected ink drop and the parameters that affect its length.

FIG. 10 shows an ejected ink drop shortly after ejection from an inkjet nozzle. An elongated portion of the ink drop, sometimes called a ligament 904, has separated from the lead spherical portion of the drop 908 and the trailing end of the drop 912. As shown by the formula in the figure, the length of this ligament 904 is proportional to the product of the nozzle diameter, the square of the ink viscosity, and the velocity of the ink divided by the product of the density and the cube of the surface tension. The longer the length of the ligament, the higher the probability that the ligament fractures and forms satellites. These satellites behave across the print gap differently than the larger well-formed drops before they land on the media. Their velocity loss is greater, their momentum is lower, and their susceptibility to airflows is higher among other factors. These satellites contribute to the image blur such as that shown in FIG. 9.

Figure 3:
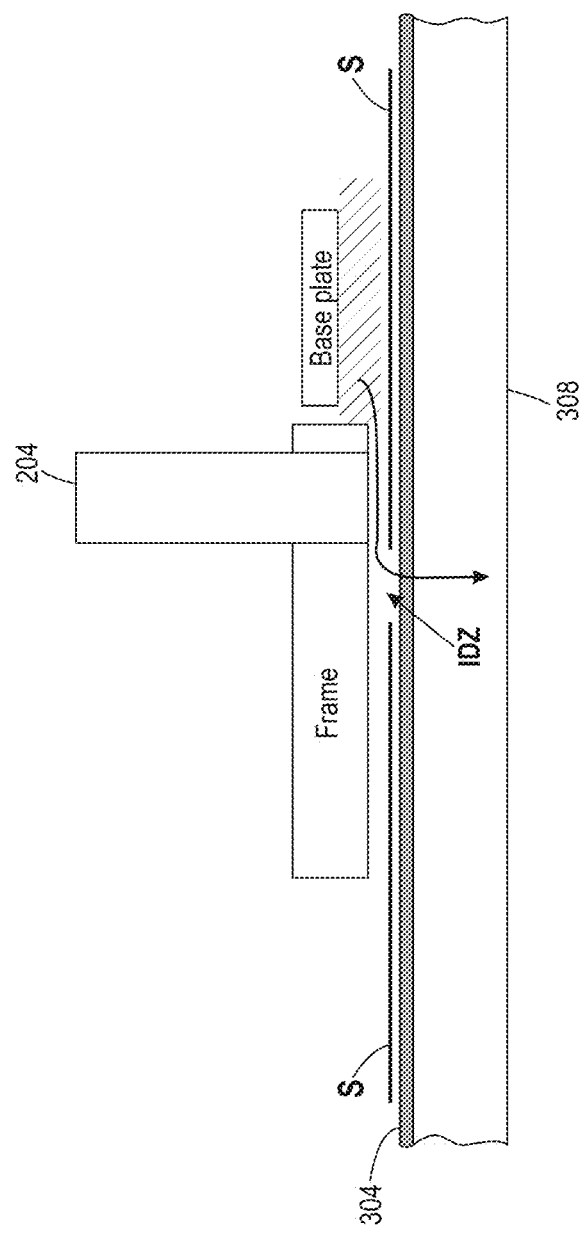
FIG. 3 illustrates the generation of an airflow disturbance at an IDZ between consecutive sheets.

A representative example of airflow disturbance is shown in FIG. 3. When the IDZ between two sheets reaches the printhead 204 as shown in the figure, the hatched volume of air is pulled by the vacuum of vacuum plenum 308 through holes in belt 304 to produce an airflow past the printhead. This airflow can affect the landing of ink drops ejected by the printhead 204 onto the trailing edge of the rightmost sheet S. This airflow is greatest at the inkjets nearest the IDZ. Therefore, the inkjets closer to the base plate shown in the figure are selected for ejecting ink drops that otherwise would be ejected by the inkjets closer to the IDZ. These airflow disturbances have been observed, however, not to impact ejected ink drops adversely at distances of 6-7 mm from the LE, TE, and IB edges of the media sheets.

Figure 4A:
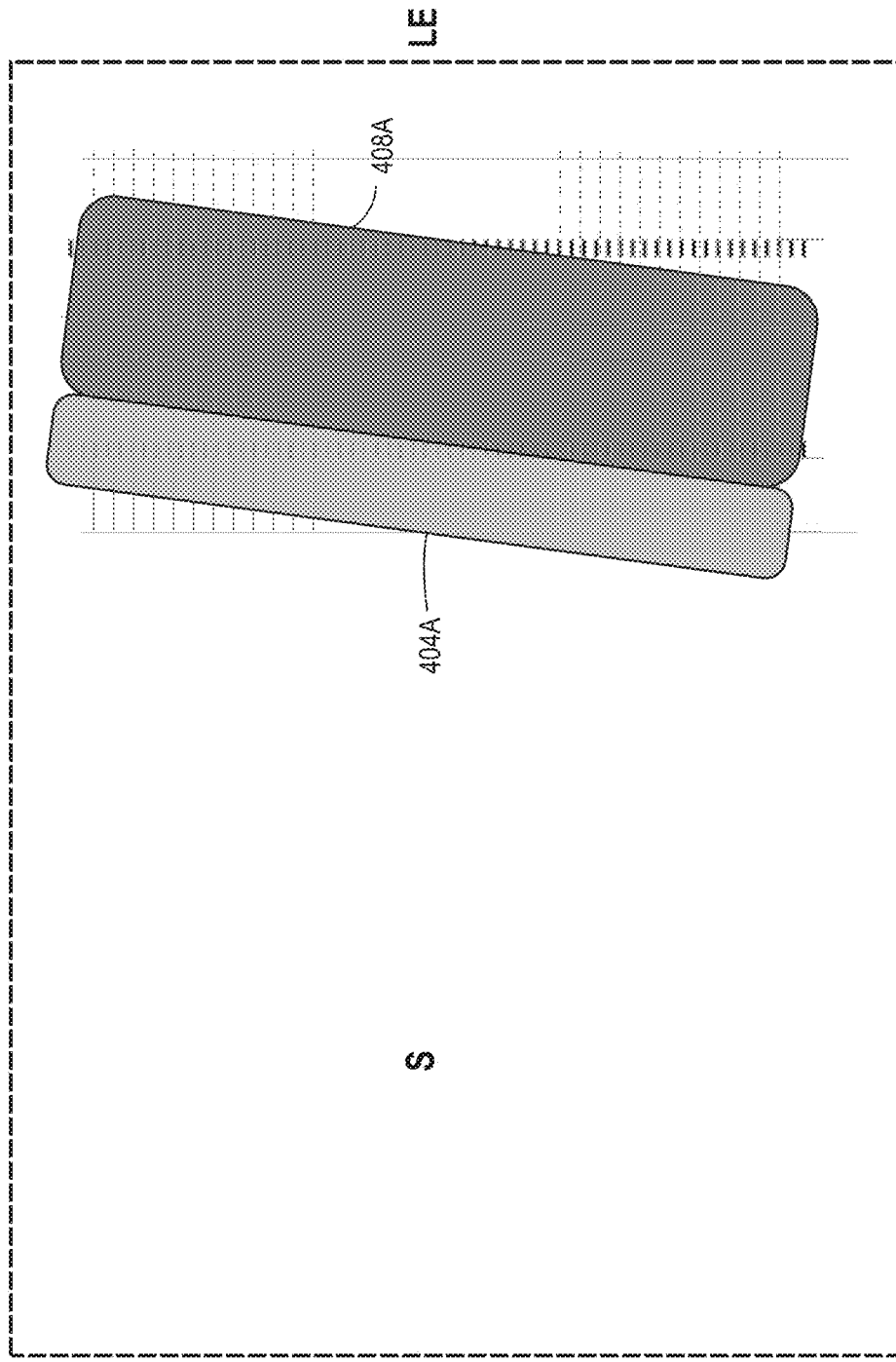
FIG. 4A shows the inkjets selected for ejecting ink drops at a leading edge of a media sheet and FIG. 4B shows the inkjets selected for ejecting ink drops at a trailing edge of a media sheet.
Figure 4B:
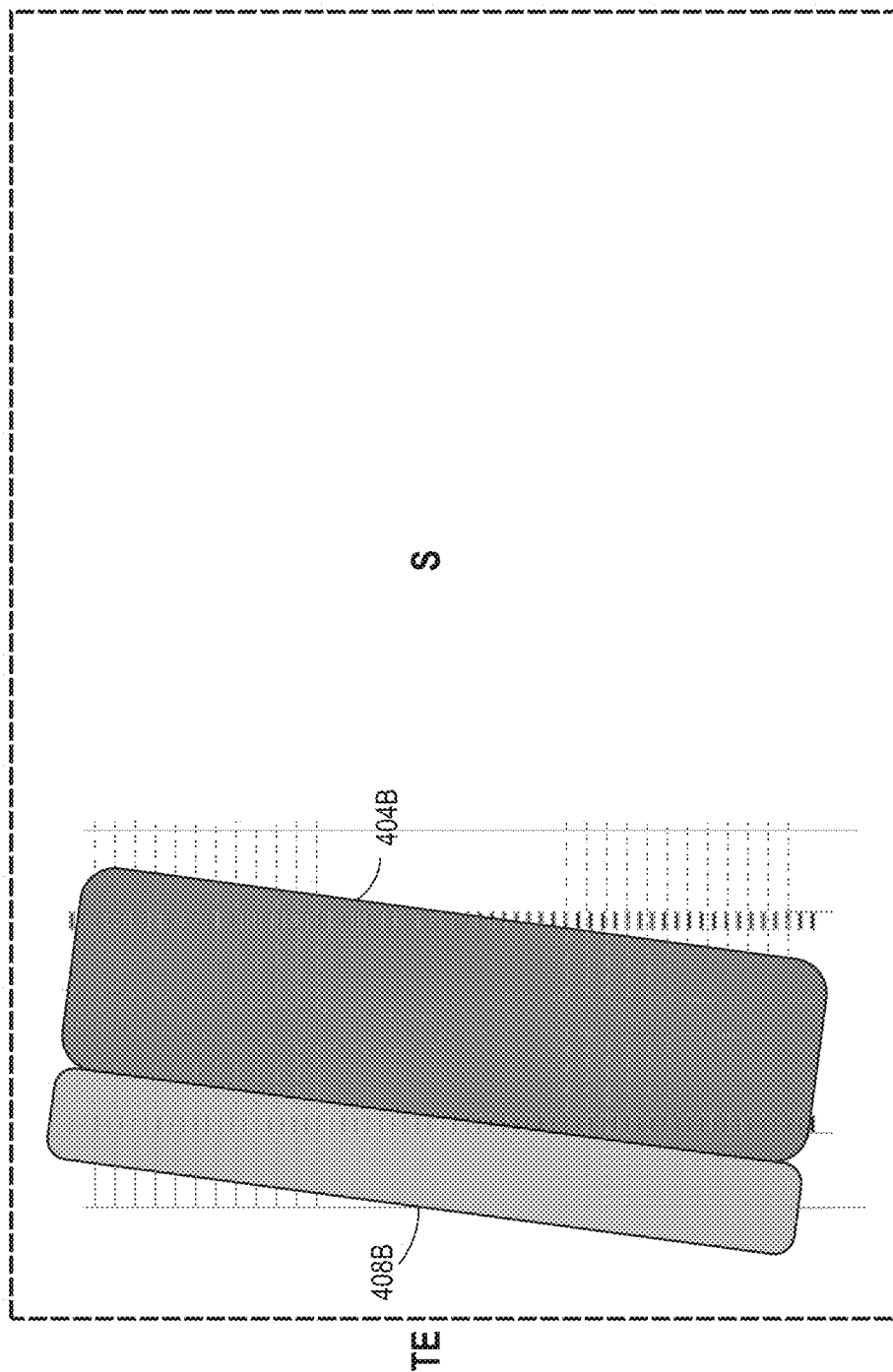

Using this information, the printer 10 compensates for ink blur caused by airflow disturbances at the leading, trailing, and inboard edges by selecting the inkjets in the printheads that are most removed from the leading, trailing, and inboard edges of the media for printing lines in those areas of the media sheets. This selection is shown in FIG. 4A and FIG. 4B. In FIG. 4A, the inkjets in the printhead that correspond to area 404A are selected for ejecting ink drops at a leading edge of a media sheet while those inkjets that correspond to area 408A are not selected for printing at that edge. In FIG. 4B, the inkjets in the printhead that correspond to area 404B are selected for ejecting ink drops at a trailing edge of a media sheet while those inkjets that correspond to area 408B are not selected for printing at that edge.

Figure 5:
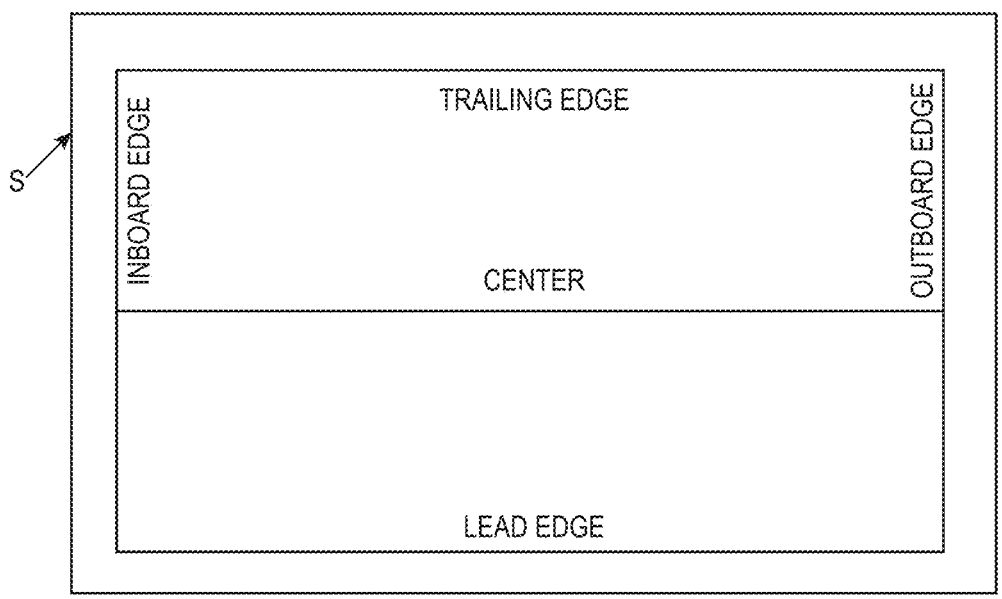
FIG. 5 is a target used to determine ink image areas on a media sheet where ink blur occurs.
Figure 6A:
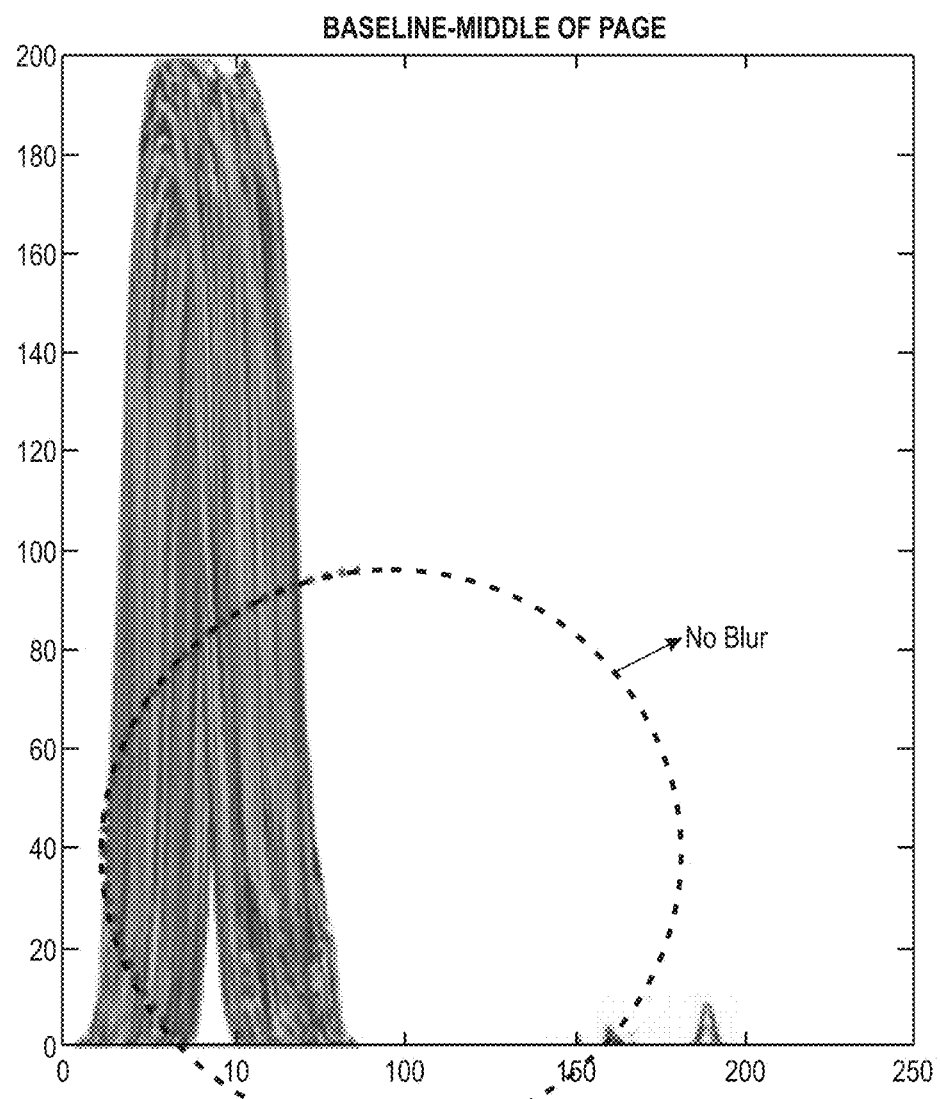
FIG. 6A is a graph of the ink in the area of the center line printed in the target of FIG. 5
Figure 6B:
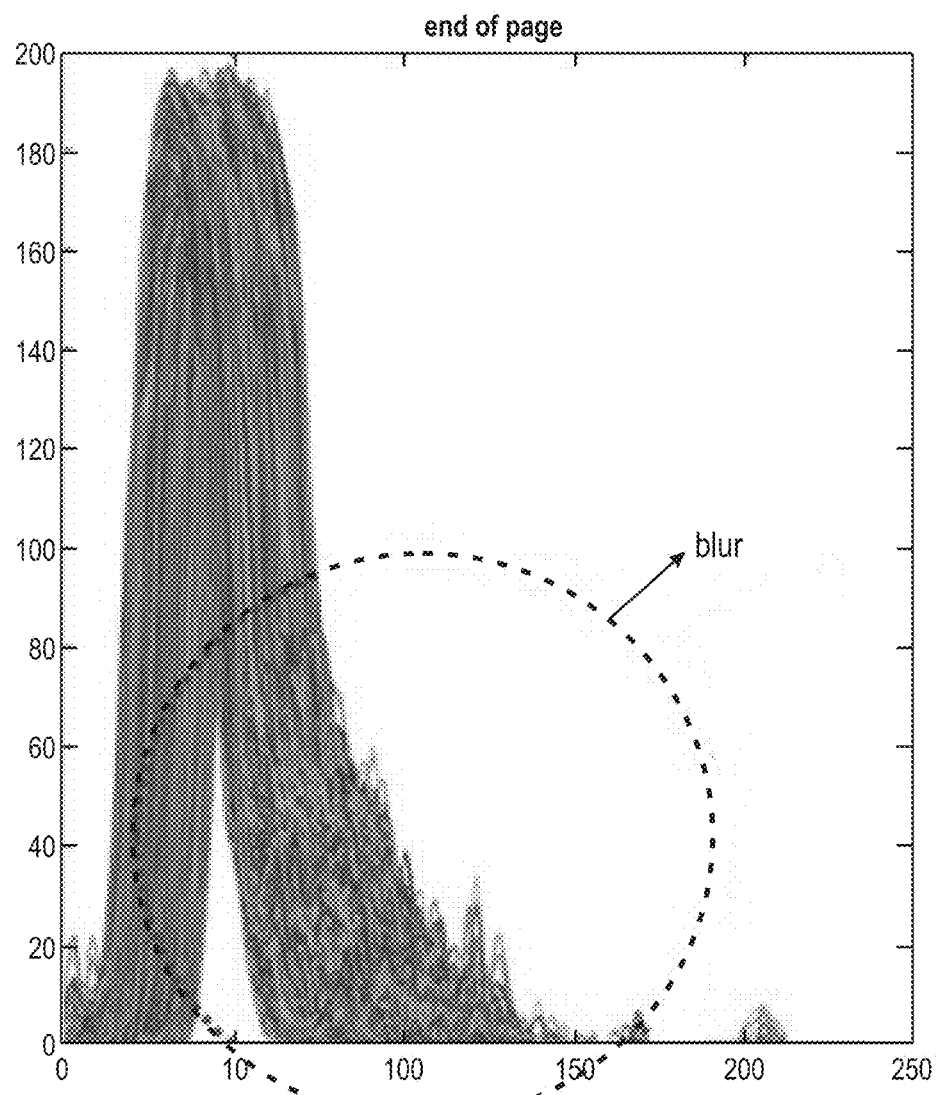
FIG. 6B is a graph of the ink in the area of the trailing edge line printed in the target of FIG. 5.

An empirical analysis was performed in the following manner to determine that the environmental conditions in particular areas of an ink image are more susceptible to the production of satellites that can cause ink blur. Specifically, a target, as shown in FIG. 5, is printed to evaluate ink blur across all edges of the media sheet. The target consists of nine pixel lines printed at ~55% fill along all edges of the paper and along one pixel line at the center of the sheet to establish a baseline. The printed image is scanned by the optical sensor 84 and every scanned pixel of the center line is plotted to produce the graph shown in FIG. 6A. As the center line approaches a position opposite the sensor 84, satellites and deviating ink drops are imaged since the resolution of the sensor 84 is significantly higher than the length of a single pixel in the process direction. That is, as the center line approaches, the sensor begins to detect the satellites and other ink drops that land on either side of the center line in the process direction. Thus, the digital image data of the center line produces multiple lines in the process direction and each of these lines extends in the cross-process direction. The grayscale values detected by the sensor in the cross-process direction form each one of the multiple lines in the process direction that correspond to the center line. As can be seen in the graph of FIG. 6A, the pixel grayscale values for these multiple lines are evenly distributed about the peak value at the center of the center line. FIG. 6B is a graph of every scanned pixel of the nine line edges printed in the process direction for the trailing edge of the target of FIG. 5. The leading edge of the trailing edge lines look similar to the leading portion of the center line in FIG. 6A. The trailing portion of the trailing edge line, however, is not as coherent because the airflow at the trailing edge of the media sheet disrupts the flight paths of the ejected ink drops and satellites produced from the ligaments of the ejected ink drops. A comparison of these two graphs demonstrates that ink blur occurs at the trailing edges of printed media sheets. Similar graphs for lines at the leading edges and lines at inboard edges show that the airflows in these areas are disruptive as well.

Figure 7:
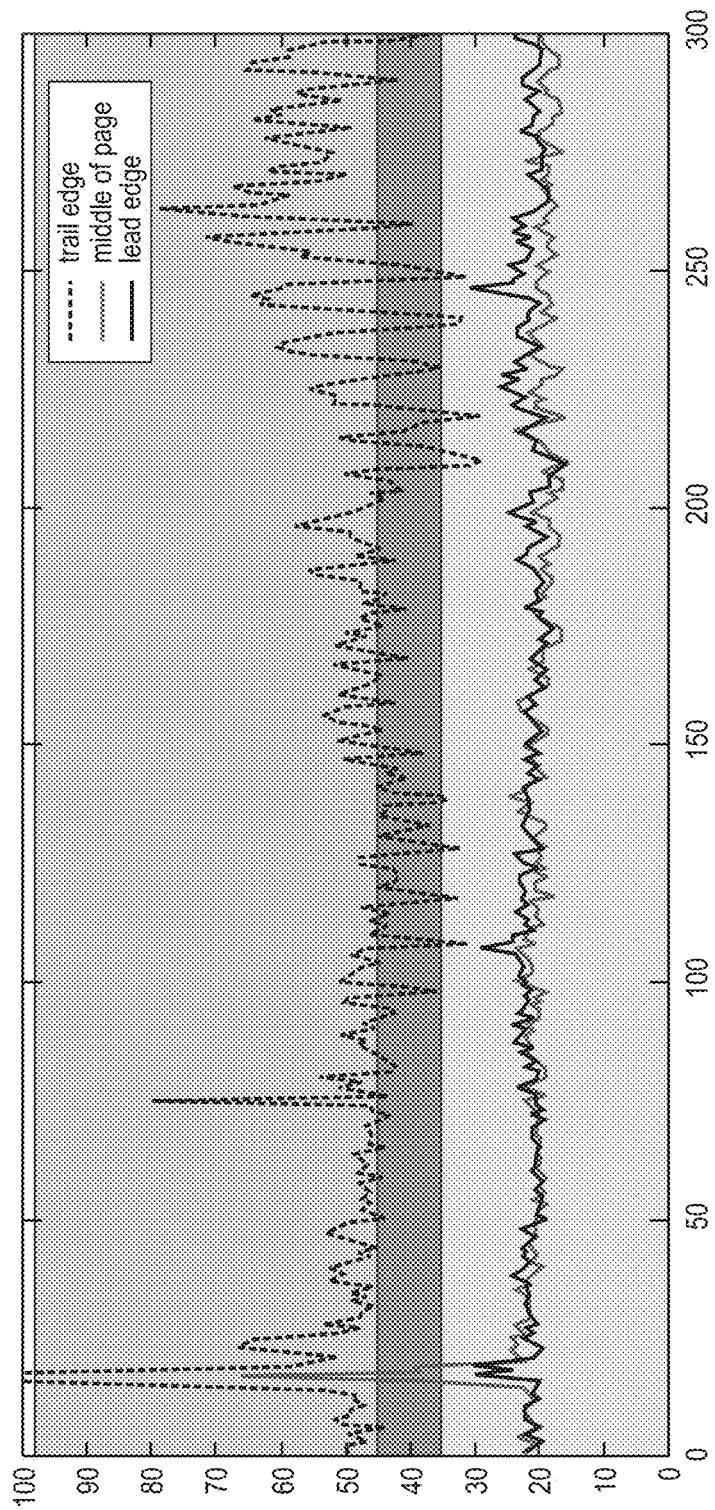
FIG. 7 is a graph identifying areas of acceptable and unacceptable ink blur based on the graphs of FIG. 6A and FIG. 6B.

An appropriate threshold of 80 on the grayscale was established for the ejected black ink and every scanned line imaged by the sensor 84 below that threshold is counted to identify satellites that have landed in an area other than where the main part of the ink drop landed. Appropriate thresholds for other colors can also be determined empirically. The identification of these satellites establishes the degree of ink blur. A rolling average over the length of the page is correlated to visual blur and yields the domains of acceptable and unacceptable ink blur depicted in the graph of FIG. 7. The graph is of an ink image in the cross-process direction as it passes the sensor 84. As can be observed from this figure, the trailing edge of a typical printed ink image is within the unacceptable ink blur range, while the leading edge and center line are within the acceptable and moderate ink blur domains except at the inboard and sometimes the outboard edges. These measurement results identify trailing edges and the side edges of ink images as requiring some type of ink blur compensation that does not require analysis of ink image content data during printing. In the printer 10, compensation for these predetermined ink image areas is performed by selecting the inkjets in the printheads that are farthest from the leading, trailing, and side edges of the media for printing lines in those areas of the media sheets.

These ink blur thresholds are stored in a memory that is operatively connected to the controller 80. As RTMJ sheets are printed during a print job to evaluate image quality, the controller is also configured to measure ink blur at the leading, trailing, and side edges of the sheet and compare the ink blur measurements at the leading edge, the trailing edge, and side edges with the predetermined ink blur threshold, as discussed above, to determine whether the ink blur is in the acceptable range or not. If the ink blur is unacceptable, even though the controller 80 has been selecting the inkjets farthest from these edges for printing these areas, then controller 80 removes one row of inkjets closest to the corresponding IDZ for the edge for selection. The removal of an additional row continues until the blur becomes acceptable. If the removal of rows of inkjets up to a predetermined number of rows does not result in an acceptable blur measurement, then the controller is configured to adjust operation of other printer components by, for example, turning off one or more vacuum channels in the vacuum plenum.

Figure 8:
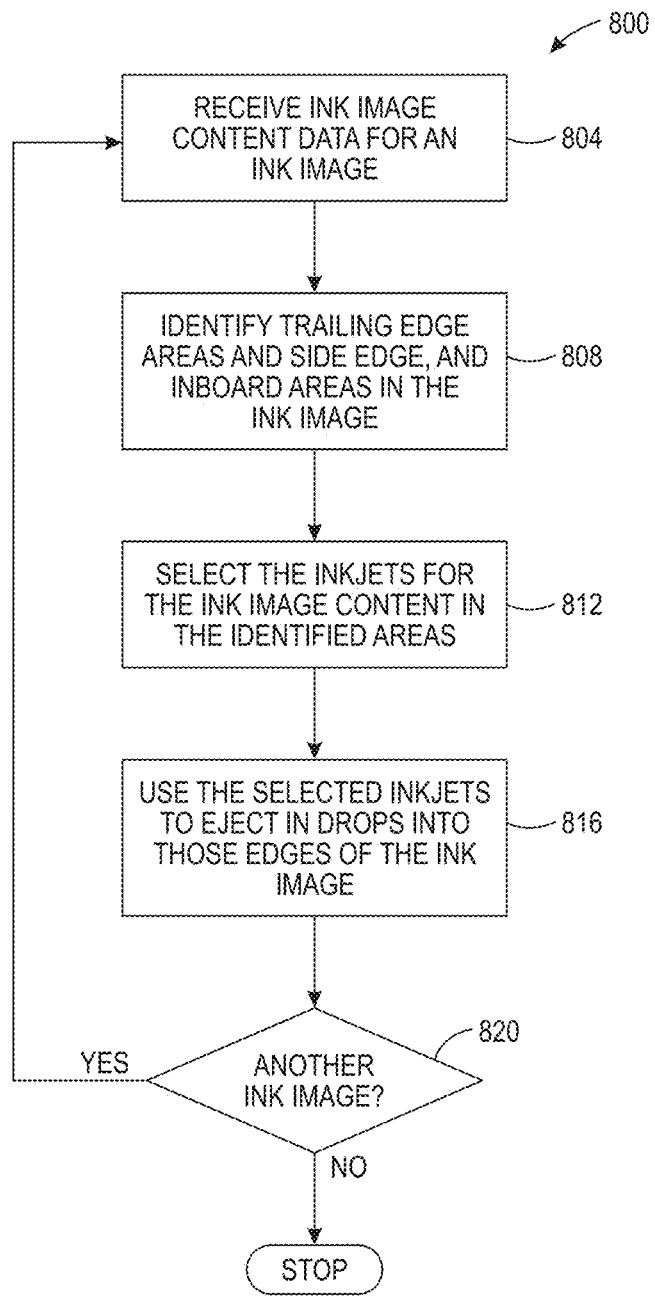
FIG. 8 is a flow diagram of a process for operating the printer of FIG. 1 to reduce ink blur at the leading, trailing, and side edges of the ink images produced by the printer.

FIG. 8 depicts a flow diagram for a process 800 that identifies areas of ink image content data to be printed at leading, trailing, and inboard edges and selects inkjets that are farthest from those edges to eject ink drops into those edges. In the discussion below, a reference to the process 800 performing a function or action refers to the operation of a controller, such as controller 80, to execute stored program instructions to perform the function or action in association with other components in the printer. The process 800 is described as being performed with the printer 10 of FIG. 1 for illustrative purposes.

The process 800 of operating the printer 10 begins with the reception of the image content data for an ink image to be printed (block 804). If a RTMJ sheet is not to be printed (block 406), then the areas of trailing edges, side edges, and inboard edges are identified (block 808). The inkjets for ejecting ink drops into these identified areas are selected (block 812). These selected inkjets are used to eject ink drops into the identified areas (block 816). If a RTMJ sheet is printed (block 406), then the RTMJ sheet is printed using the farthest inkjets in the leading, trailing, and inboard edges and image data of the printed RTMJ sheet is analyzed for ink blur (block 424). If the ink blur is not in an acceptable range (block 828), operation of the vacuum plenum is adjusted (block 832). Printing continues in this manner until the last ink image is printed (block 820). At that point, the process is finished.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An inkjet printer comprising:
   at least one printhead;
   a media transport for moving a media sheet relative to the at least one printhead in a process direction so the media sheet has a leading edge and trailing edge; and
   a controller operatively connected to the at least one printhead, the controller being configured to:
      analyze ink image content data to identify ink image features in the ink image content data that are to be printed at the leading edge and the trailing edge of the media sheet in the process direction;
      select inkjets, within the at least one printhead, to print the ink image content data at the leading edge and the trailing edge of the media sheet in the process direction; and
      operate the selected inkjets to print portions of an ink image at the leading edge and the trailing edge of an ink image that corresponds to the ink image content data.

2. The inkjet printer of claim 1, the controller being further configured to select inkjets that are a predetermined distance from the leading edge and the trailing edge of the media sheet as the media sheet passes the at least one printhead.

3. The inkjet printer of claim 2 wherein the predetermined distance is six to seven millimeters from the leading edge and the trailing edge of the media sheet.

4. The inkjet printer of claim 3, the controller being further configured to:
   analyze ink image content data to identify ink image features in the ink image content data that are to be printed at a side edge of a media sheet in the process direction;
   select the inkjets to print the ink image content data in the side edge of the media sheet in the process direction; and
   operate the selected inkjets to print portions of an ink image in the side edge of an ink image that corresponds to the ink image content data.

5. The inkjet printer of claim 4 wherein the side edge of the media sheet is an inboard edge of the media sheet in the print zone.

6. The inkjet printer of claim 4 wherein the side edge of the media sheet is an outboard edge of the media sheet in the print zone.

7. The inkjet printer of claim 4 further comprising:
   an optical sensor configured to generate image data of a media sheet after the media sheet has been printed by the at least one printhead; and the controller being further configured to:
   receive image data of the printed media sheet from the optical sensor;
   identify an ink blur measurement from the image data of the printed media sheet;
   compare the identified ink blur measurement to a predetermined threshold; and
   adjust operation of the printer when the identified ink blur measurement exceeds the predetermined threshold.

8. The inkjet printer of claim 7, the controller being further configured to remove a row of inkjets for selection.

9. The inkjet printer of claim 8, the controller being further configured to remove one more row of inkjets for selection up to a predetermined number of rows.

10. The inkjet printer of claim 9, the controller being further configured to:
    turn off one or more vacuum channels in a vacuum plenum once the predetermined number of rows have been removed from selection.

11. A method of operating an inkjet printer comprising:
    analyzing ink image content data to identify ink image features in the ink image content data that are to be printed at a leading edge and a trailing edge of a media sheet in a process direction;
    selecting inkjets to print the ink image content data in the leading edge and the trailing edge of the media sheet in the process direction; and
    operating the selected inkjets to print portions of an ink image in the leading edge and the trailing edge of an ink image that corresponds to the ink image content data.

12. The method of claim 11 further comprising:
    selecting inkjets that are a predetermined distance from the leading edge and the trailing edge of the media sheet as the media sheet passes at least one printhead.

13. The method of claim 12 wherein the predetermined distance is six to seven millimeters from the leading edge and the trailing edge of the media sheet.

14. The method of claim 13 further comprising:
    analyzing ink image content data to identify ink image features in the ink image content data that are to be printed at a side edge of a media sheet in the process direction;
    selecting the inkjets to print the ink image content data in the side edge of the media sheet in the process direction; and
    operating the selected inkjets to print portions of an ink image in the side edge of an ink image that corresponds to the ink image content data.

15. The method of claim 14 wherein the side edge of the media sheet is an inboard edge of the media sheet in the print zone.

16. The method of claim 14 wherein the side edge of the media sheet is an outboard edge of the media sheet in the print zone.

17. The method of claim 14 further comprising:
    generating image data of a media sheet after the media sheet has been printed by the at least one printhead;
    identifying an ink blur measurement from the image data of the printed media sheet;
    comparing the identified ink blur measurement to a predetermined threshold; and
    adjusting operation of the printer when the identified ink blur measurement exceeds the predetermined threshold.

18. The method of claim 17, the adjustment of the printer operation further comprising:
   removing a row of inkjets for selection.

19. The method of claim 18, the adjustment of the printer operation further comprising:
   removing one more row of inkjets for selection up to a predetermined number of rows.

20. The method of claim 19 further comprising:
   turning off one or more vacuum channels in a vacuum plenum once the predetermined number of rows have been removed from selection.

* * * * *